Sept. 12, 1944.  C. P. GIBBERT  2,358,158
ELECTRODE HOLDER
Filed April 17, 1943

Inventor:
Christian P. Gibbert,
by Harry E. Dunham
His Attorney.

Patented Sept. 12, 1944

2,358,158

UNITED STATES PATENT OFFICE 2,358,158

ELECTRODE HOLDER

Christian P. Gibbert, Sellersville, Pa., assignor to General Electric Company, a corporation of New York Application April 17, 1943, Serial No. 483,412

14 Claims. (Cl. 219—8)

My invention relates to electrode holders of improved construction. It is particularly suited for use in gas-arc torches wherein gas is supplied through a combined electrode holder and nozzle about the arcing terminal of an electrode supported in the nozzle. An atomic hydrogen torch is one example of such a gas-arc torch.

An atomic hydrogen torch is particularly suited for utilizing the heating effects of flames of atomic hydrogen. An atomic hydrogen flame may be produced by disassociating hydrogen to its atomic state through the agency of an electric arc and then allowing the disassociated hydrogen to recombine or "burn." Upon recombination to its molecular state, the atomic hydrogen liberates an enormous amount of heat which may be used for welding or like operations. The utilization of flames of atomic hydrogen is disclosed and claimed broadly in U. S. Letters Patent No. 1,947,267—Irving Langmuir, granted February 13, 1934. While my invention is well suited for holding the electrodes of atomic hydrogen torches, it may also be used in other gas-arc torches where a welding medium of any suitable character is supplied to and about the arcing terminal of an electrode. My invention is, however, not limited to use in gas-arc torches since it may be used for holding an electrode of any apparatus employed in welding, heating, lighting or other applications.

It is an object of my invention to provide an electrode holder of compact and simplified construction.

It is also an object of my invention to provide an electrode holder which is readily contained in the nozzle of a gas-arc torch.

It is another object of my invention to provide an electrode clamping arrangement, one element of which may be added to a structure such as shown in U. S. Letters Patent No. 2,014,226—James T. Catlett, granted September 10, 1935, to adapt it for holding an electrode of smaller size than that for which the collet clamp of this patent is suited or to adapt it for holding electrodes of the size for which the collet clamp of this patent is normally suited but for which it has become unsuited due to damage resulting from exposure to wear, destructive heating or some other incapacitating influence.

Other objects of my invention will become apparent from the following description of the two embodiments thereof illustrated in the accompanying drawing.

Figure 1:
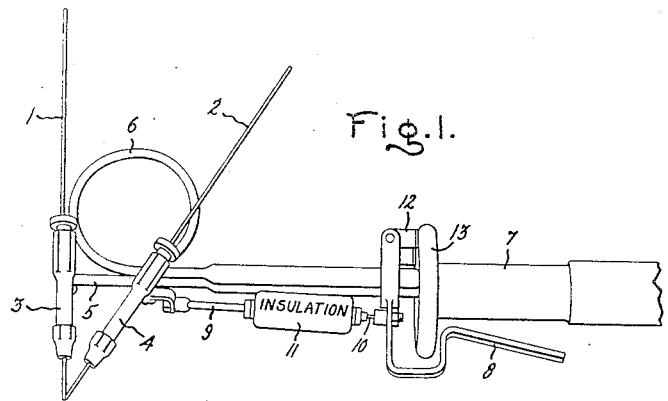
Figure 2:
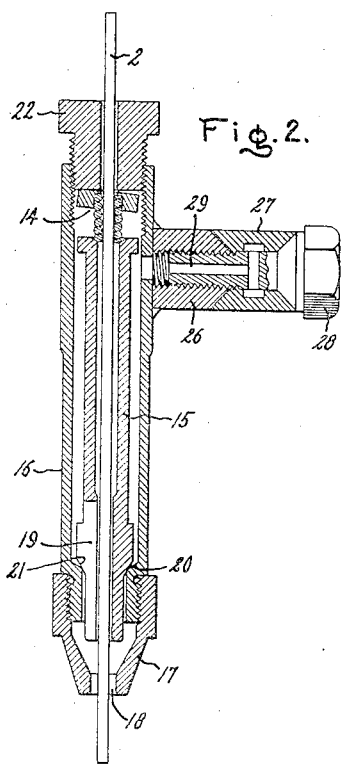
Figure 4:
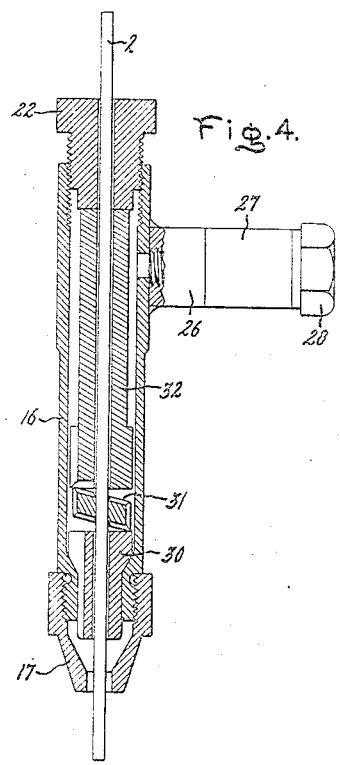
Figures 3, 5:
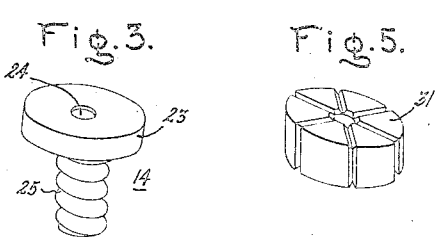

Fig. 1 of this drawing is a side view of an atomic hydrogen torch embodying my invention; Fig. 2 is a sectional view of the parts constituting the electrode holder and nozzle of this torch; Fig. 3 is a perspective view of the electrode clamping element forming part thereof; Fig. 4 is a sectional view of another embodiment of my invention in which a different arrangement of parts embodying the same working principle has been employed; and Fig. 5 is a perspective view of the electrode clamping washer forming an element of the arrangement illustrated in Fig. 4.

In accordance with my invention an electrode is held by a plurality of members having electrode passageways and abutting end surfaces so related to one another that these surfaces are angularly disposed relatively to one another when said members are aligned by an electrode extending through their electrode passageways. These members are contained within a receptacle which holds them for relative movement lengthwise of an electrode extending through their electrode passageways and which holds one of them for tilting movement which brings opposite walls of its electrode passageway into clamping engagement with opposite sides of the electrode extending therethrough. Means are provided for imparting lengthwise relative movement to these members and thereby bringing their abutting end surfaces into forceful engagement with one another to impart tilting movement to one of them and bring opposite side walls of its electrode passageway into clamping engagement with the electrode extending through these members. In a gas-arc torch these members may be contained within a nozzle through which gas is supplied by a passageway to an opening in its tip from which the gas is discharged about the arcing terminal of the electrode extending through the nozzle and projecting through the opening in its tip.

In the atomic hydrogen torch shown in Fig. 1 electrodes 1 and 2 are supported in combined electrode holders and gas nozzles 3 and 4 which are independently supported on tubes 5 and 6 which project from a handle 7. Electrode holder and nozzle 4 is connected to a lever 8 by rods 9 and 10 which are connected and electrically insulated from one another by a member 11. This lever is pivoted to a bracket 12 mounted on a guard 13 forming part of handle 7. Movement of lever 8 consequently moves electrode 2 supported in electrode holder and nozzle 4 relative to electrode 1 supported in electrode holder and nozzle 3. This limited movement is made possible by providing tube 6 with a looped portion which is sufficiently resilient for this purpose and which also acts as a spring member which tends to hold the electrodes in a given position relative to one another. Electricity and gas are supplied to the combined electrode holders and nozzles 3 and 4 through tubes 5 and 6 by means of connections within the end portion of the handle 7 which has not been illustrated in the drawing.

One construction of the combined electrode holders and nozzles 3 and 4 is illustrated in the sectional view of Fig. 2. Except for member 14 which has been shown in perspective in Fig. 3 the arrangement of parts is the same as that illustrated in United States Letters Patent No. 2,014,226—James T. Catlett, granted September 10, 1935. By the addition of member 14, the structure of this patent is adapted for holding an electrode of smaller size than that for which the collet clamp of this patent is suited. The addition of member 14 also adapts the structure of this patent for holding electrodes of a size for which the collet clamp of the patent is normally suited but for which it has become unsuited due to damage resulting from exposure to wear, destructive heating or some other incapacitating influence.

The structure before modification comprises a collet 15 which is located within a nozzle 16. This nozzle terminates in a tip 17 which forms with the discharge end of the nozzle a chamber having a discharge opening 18 greater in size than the electrode supported therein. The electrode is centered in this opening 18 by collet 15 which is slotted at its lower end to form clamping jaws 19 for the electrode. Nozzle 16 is provided with an internal wedging surface 20 against which an external wedging surface 21 at the jaws 19 of the collet 15 is intended to cooperate and force these jaws into engagement with the electrode extending therethrough when collet 15 is given a lengthwise movement. Thumb screw 22 which is threaded into the upper inside surface of nozzle 16 is provided for imparting this lengthwise movement to collet 15.

If, due to wear, collet 15 is no longer suited for its intended purpose or if it is desired to support an electrode of smaller size than that for which the collet is adapted, this may be accomplished in accordance with my invention by inserting member 14 between the adjacent ends of thumb screw 22 and collet 15. In order to provide a cavity of sufficient size therefor the length of the threaded portion of screw 22 has been reduced.

Member 14 comprises a washer 23 and a resilient tube 25 each of which has a longitudinal electrode passageway 24 therethrough. Tube 25 is integral with and mounted on one end of washer 23 so that the longitudinal axis of the passageway through it and washer 23 forms an oblique angle with the surface of the other end of the washer. In the arrangement illustrated tube 25 is a helical spring whose coils abut one another so that lengthwise deformation of the spring is prevented. It is, however, free to yield in a lateral direction and thus prevent any concentration of clamping forces which might be severe enough to break electrodes made of some brittle material. In effect washer 23 forms a flange at one end of the helical spring or flexible sleeve 25.

As shown in Fig. 2 the unflanged end of member 14 is seated in a cup-like socket formed in the upper end of collet 15 by the beveled end surface of the electrode passageway through the collet. The end surface of the flanged portion of member 14 is located at an oblique angle to the end surface of thumb nut 22 when the parts are aligned by an electrode extending through the electrode passageways in collet 15, member 14 and thumb screw 22. The end surface of thumb screw 22 which is brought into abutting engagement with the flanged end portion of member 14 has an end surface at right angles to the longitudinal electrode passageway therethrough. Consequently, as the thumb screw is threaded into the nozzle and advanced longitudinally of the electrode extending therethrough its end surface is brought into forceful engagement with the flanged end surface of member 14 and tilts this member so that its flexible and resilient tube portion which has the same bodily movement is tilted into clamping engagement with opposite side walls of the electrode extending through its longitudinal electrode passageway. It is to be noted that the space between thumb screw 22 and collet 15 in the upper portion of nozzle 16 forms a cavity within which this member is mounted for tilting movement imparted thereto by deflecting its flanged end surface toward a position at right angles with the longitudinal axis of the electrode extending through the passageway in this member.

Gas is supplied to nozzle 16 through an arm 26 which also acts as a support for the nozzle. This arm is attached to a connection 27 at the end of tubes 5 or 6 of the torch by means of a cap screw 28. The end of arm 26 and the head of cap screw 28 are provided with opposed clamping surfaces which are adapted to engage the opposite side walls of the connection 27 to form an electrical and gas-tight connection between the combined electrode holder and nozzle and its supporting tube through which gas and electricity are supplied. Gas is supplied to the chamber within nozzle 16 from the passageway in tubes 5 or 6 and their connections 27 by a passageway 29 extending from the side walls of screw 28 near its head to its tip within arm 26. Gas is supplied from the chamber within nozzle 16 to the chamber within tip 17 through the slotted end portion of collet 15. These slots form gas passageways extending past the seating surfaces between the collet sleeve and the nozzle and form part of the gas passageway through the nozzle to the opening in its tip 17. Gas supplied to the nozzle tip is discharged about electrode 2 and totally envelops its arcing terminal portion.

It is apparent that the construction of the combined electrode holder and nozzle is such that electricity will be supplied to the electrode support therein in view of the fact that the various parts are formed of metal and are conductors of electricity.

In view of what has been stated above, the operation of applicant's invention is believed to be apparent. Briefly, the clamping action depends on the tilting movement imparted to member 14 which is inserted between collet 15 and thumb screw 22. The physical structure of member 14 is such that an electrode extending through the electrode passageways in collet member 15, member 14 and thumb screw 22 positions the flanged end surface of member 14 at an angle to the end of thumb screw 22 which is in abutting engagement therewith. Forceful engagement of these abutting surfaces tilts member 14 and brings opposite side walls of the passageway therethrough into clamping engagement with the electrode. Thus even though collet 15 is unsuited for its intended purpose, the insertion of member 14 between collet 15 and thumb screw 22 will condition it for further use.

If collet 15 is still effective for its electrode holding function, the addition of member 14 to the combination disclosed in the above Catlett patent will serve another purpose. It will be noted that when an electrode becomes so short that its upper end passes into the nozzle beyond the passageway in thumb screw 22, gas will escape through this passageway. Consequently, it has been the practice to discard an electrode when its length becomes insufficient to close the passageway in thumb nut 22. By the use of clamping member 14, however, a new length of electrode may be inserted through the passageway in thumb nut 22 and held by member 14 while the normally discarded stub end of the old electrode is clamped in the nozzle by collet 15. Consequently, the presence of member 14 in combination with a collet 15 which is useful for its intended purpose makes it possible to use electrode material more economically for previously discarded stub ends of electrodes can be used until their length is reduced until the clamping jaws of collet 15 can no longer engage them.

Thus member 14 or its equivalent in the combination illustrated not only serves to recondition the combination to which it is added but also serves to render the combination suitable for clamping electrodes for which the size of the collet is unsuited and to use economically stub ends of electrodes for which the size of the collet is suited.

It is, of course, apparent that other physical embodiments of my invention will occur to those skilled in the art. One such modification is illustrated in Fig. 4.

In this arrangement member 31 is the equivalent of member 14 of Fig. 2 and sleeve members 30 and 32 serve to center the electrode in the nozzle in the same manner as collet 15 of Fig. 2. Otherwise the parts of Fig. 4 are the same as those of Fig. 2 and like reference numbers have been applied. It is to be noted, however, that the end surface of thumb screw 22 of Fig. 2 has been removed to provide a cavity for member 14 whereas in Fig. 4 it has not been necessary to make this modification.

Sleeve 30 forms a support or abutment for member 31 and sleeve 32 transmits the lengthwise movement of thumb screw 22 to member 31. The side wall surface of sleeve 30 has been slotted to provide gas passageways into nozzle tip 17 and the lower side walls and end portion of sleeve 32 have been slotted to form gas passageways lengthwise of nozzle 16. Member 31 has also been slotted at its ends and sides to facilitate the passage of gas thereby. This member is shown in perspective view in Fig. 5.

Member 31 like member 14 of Fig. 2 is in effect a washer having a longitudinal electrode passageway which extends therethrough at an oblique angle to its end surfaces. When the electrode passageways through members 30, 31 and 32 are aligned by an electrode extending therethrough, the end surfaces of washer 31 are positioned at oblique angles to the abutting end surfaces of members 30 and 32 which are positioned at right angles to their electrode passageways. Consequently, when members 30 and 32 are moved lengthwise toward one another by the application of pressure to the upper end of member 32 by thumb screw 22, member 31 is tilted and brought into clamping engagement with the electrode extending through its passageway.

By locating clamping member 31 near the tip portion of the nozzle, current is introduced into the electrode at a point nearer its arcing terminal than in the arrangement illustrated in Fig. 2.

Other arrangements embodying applicant's invention will occur to those skilled in the art. For example, the clamping washer may have end surfaces at right angles to the longitudinal electrode passageway therethrough and members 30 and 32 may have end surfaces which form an oblique angle with the longitudinal electrode passageways therethrough. If washer 31 is supported for tilting movement only one end surface of either member 30 or 32 need be disposed at an oblique angle to the longitudinal electrode passageway therethrough.

It is obvious that the arrangement of parts above described need not be located within a nozzle member since any suitable receptacle may be provided for holding them. Furthermore, the connection between the receptacle and these parts by means of which their abutting end surfaces are brought into forceful engagement with one another need not be the threaded connection existing between thumb screw 22 and nozzle 16 since any other suitable arrangement may be provided.

It is thus apparent that my invention is not limited to the particular detailed constructions illustrated and described above and that various modifications thereof may be made without departing from the teachings of my invention. I aim, therefore, to cover in the appended claims all such modifications as fall within the true spirit and scope of my invention.

What I claim as new and desire to secure by Letters Patent of the United States is:

1. An electrode holder comprising a plurality of members having electrode passageways and abutting end surfaces so related to one another that said end surfaces are angularly disposed relatively to one another when said members are aligned by an electrode in said passageways, a receptacle which holds one of said members for movement lengthwise of an electrode extending through said passageways in said members and which holds the other of said members for tilting movement which brings the walls of its said passageway into clamping engagement with said electrode, and a connection between said receptacle and said one member by means of which said one member is moved lengthwise of an electrode extending through its said passageway to bring said angularly disposed abutting end surfaces of said members into forceful engagement with one another and thereby impart electrode clamping tilting movement to the other of said members.

2. An electrode holder comprising a member having a longitudinal electrode passageway which extends therethrough at an oblique angle to an end surface thereof, a support in which said member is mounted for tilting movement which brings opposite side walls of its said passageway into clamping engagement with an electrode extending therethrough, a second member having an end surface at right angles to a longitudinal electrode passageway therethrough, and means for moving said second member and said support relatively to one another and thereby bringing said end surfaces of said members into forceful abutting engagement with one another and thereby imparting tilting movement to said first mentioned member to bring it into clamping engagement with an electrode extending through said passageways in said members.

3. An electrode holder comprising a support, a clamping member mounted for tilting movement in said support and having therethrough an electrode passageway the opposite side walls of which are brought into clamping engagement with an electrode in said passageway by tilting movement of said clamping member, and means on and projecting from said support and having an end surface angularly disposed to and abutting the end surface of said clamping member for tilting and bringing it into clamping engagement with an electrode extending therethrough lengthwise of said support.

4. An electrode holder comprising a tubular member, a screw having a longitudinal electrode passageway therethrough, a washer tiltably supported in said tubular member and having a longitudinal electrode passageway therethrough, a resilient tube mounted on said washer for bodily movement therewith and having a longitudinal electrode passageway therethrough which positions the abutting end surfaces of said screw and said washer at an angle to one another when they are aligned by an electrode extending through said passageways in said screw, said washer and said tube, and a threaded connection between said screw and said tubular member by means of which said abutting end surfaces of said screw and said washer are brought forcefully together to tilt said washer and bring said resilient tube into clamping engagement with an electrode extending therethrough.

5. An electrode holder comprising a resilient tube having a flange at one end thereof and a longitudinal electrode passageway therethrough which positions the end surface of said flange at an oblique angle to the longitudinal axis of an electrode extending through said passageway, a support having a cavity within which said tube is mounted for tilting movement imparted thereto by deflecting its flanged end surface toward a position at right angles with the longitudinal axis of an electrode extending through said electrode passageway in said tube, a member having an end surface at right angles to a longitudinal electrode passageway therethrough, and a connection between said member and said support by means of which said end surface of said member is brought into forceful engagement with said end surface of said flange and tilts said tube into clamping engagement with an electrode extending through said passageways in said member and said tube.

6. An electrode holder comprising a helical spring having a flange at one end thereof and a longitudinal electrode passageway therethrough which positions the end surface of said flange at an oblique angle to the longitudinal axis of an electrode extending through said passageway, a support having a cavity within which said spring is mounted for tilting movement imparted thereto by deflecting its flanged end surface toward a position at right angles with the longitudinal axis of an electrode extending through said passageway in said spring, a screw having an end surface at right angles to a longitudinal electrode passageway therethrough, and a threaded connection between said screw and said support by means of which said end surface of said screw is brought into forceful engagement with said end surface of said flange and tilts said spring into clamping engagement with an electrode extending through said passageways in said screw and said spring.

7. An electrode holder comprising a helical spring having a flange at one end thereof and a longitudinal electrode passageway therethrough which positions the end surface of said flange at an oblique angle to the longitudinal axis of an electrode extending through said passageway, a support having a longitudinal electrode passageway terminating in a cupped socket which accommodates lateral movement of the other end of said spring when its flanged end is deflected toward a position at right angles with the longitudinal axis of an electrode extending through said passageway in said spring, a screw having an end surface at right angles to a longitudinal electrode passageway therethrough, and a threaded connection between said screw and said support by means of which said end surface of said screw is brought into engagement with said end surface of said flange and tilts said spring into clamping engagement with an electrode extending through said passageways in said screw, said support and said spring.

8. An electrode holder for gas-arc torches comprising a nozzle having a gas passageway therein which terminates in an opening of greater size than the electrode extending through said nozzle and said opening, a guide member having an electrode passageway therethrough which centers an electrode in said nozzle opening, a clamping member supported on said guide member for tilting movement in said nozzle and having therethrough an electrode passageway opposite side walls of which are brought into clamping engagement with an electrode in said passageway by tilting movement of said member, means on and projecting from said nozzle and having an end surface angularly disposed to and abutting the end surface of said clamping member for tilting it into clamping engagement with an electrode extending through its said passageway lengthwise of said nozzle, and an arm attached to said nozzle and having a gas passageway therein communicating with said passageway in said nozzle.

9. An electrode holder for gas-arc torches comprising a nozzle terminating at one end in a tip having an opening therein of greater size than the electrode extending through said nozzle and said tip, a sleeve seated in said nozzle and having gas passageways extending past the seating surfaces between said sleeve and said nozzle and an electrode passageway which centers an electrode in said opening in said tip of said nozzle, a member supported for tilting movement on the end of said sleeve and having an end surface which is positioned at an oblique angle to the longitudinal axis of an electrode extending through an electrode passageway extending lengthwise of said member, a screw which is threaded into the other end of said nozzle and applies pressure to said end surface of said member to tilt it into clamping engagement with an electrode extending through its said passageway, and means for supplying gas to said nozzle and through said opening in its said tip.

10. An electrode holder for gas-arc torches comprising a member having a longitudinal electrode passageway therethrough which positions an end surface of said member at an oblique angle to the longitudinal axis of an electrode extending through said passageway, a nozzle within which said member is mounted for tilting movement imparted thereto by deflecting its said end surface toward a position at right angles with the longitudinal axis of an electrode extending through said passageway in said member, a second member extending into said nozzle and having an end surface at right angles to a longitudinal electrode passageway therethrough, a connection between said second member and said nozzle by means of which said end surface of said second member is brought into engagement with said end surface of said first mentioned member and tilts said first mentioned member into clamping engagement with an electrode extending through said passageways in said members, and means for supplying gas to said nozzle and lengthwise of the end portion of an electrode extending through and projecting from said nozzle.

11. An electrode holder for gas-arc torches comprising a nozzle having a gas passageway therein which terminates in a tip having an opening of greater size than the electrode supported in said nozzle and extending through said opening, a washer tiltably supported in said nozzle and having a longitudinal electrode passageway therethrough, a member having a longitudinal electrode passageway therethrough and an end surface abutting the end surface of said washer, a resilient tube mounted on said washer for bodily movement therewith and having a longitudinal electrode passageway therethrough which positions the end surfaces of said member and said washer at an angle to one another when they are aligned by an electrode extending through their said passageway, means in said nozzle for displacing said member lengthwise of said nozzle to bring the abutting end surfaces of said member and said washer forcibly together and thereby tilt said washer and bring said tube into clamping engagement with an electrode extending therethrough, and an arm which supports said nozzle and has a passageway therein communicating with the gas passageway in said nozzle.

12. An electrode holder for gas-arc torches comprising a nozzle terminating at one end in a tip having an opening therein of greater size than the electrode extending through said nozzle and said tip, a sleeve seated in said nozzle and having gas passageways extending past the seating surfaces between said sleeve and said nozzle and an electrode passageway which centers an electrode in the opening in said tip of said nozzle, a helical spring one end of which is supported on the end of said sleeve and the other end of which has a flange whose end surface is positioned at an oblique angle to the longitudinal axis of an electrode extending through an electrode passageway extending lengthwise of said spring, a screw which is threaded into the other end of said nozzle and applies pressure to said end surface of said flange to tilt said spring into clamping engagement with an electrode extending therethrough, and means for supplying gas to said nozzle and through said opening in its said tip.

13. An electrode holder for gas-arc torches comprising a nozzle having an internal wedging surface at its discharge end which forms a tip having an opening therein of greater size than the electrode extending through said nozzle and said tip, means for supplying gas through said nozzle and said opening in its said tip, a collet tube having at one end thereof a plurality of jaws with external wedging surfaces which engage the internal wedging surface of said nozzle, a clamping member supported on the other end of said collet for tilting movement in said nozzle and having therethrough an electrode passageway the opposite side walls of which are brought into clamping engagement with an electrode in said passageway by tilting movement of said member, and a screw threaded into the other end of said nozzle to form a substantially gas-tight closure therefor through which said electrode extends, said screw having an end surface angularly disposed to and abutting the end surface of said clamping member for tilting it into clamping engagement with an electrode extending through its said passageway and for simultaneously imparting lengthwise movement to said collet tube and deflecting its jaws into engagement with an electrode extending therethrough by forcing together said wedging surfaces on said collet jaws and on said nozzle.

14. An electrode holder for gas-arc torches comprising a nozzle having an internal wedging surface at its discharge end which forms a tip having an opening therein of greater size than the electrode extending through said nozzle and said tip, means for supplying gas through said nozzle and said opening in its said tip, an electrode centering and clamping sleeve in said nozzle having at one end an external wedging surface cooperating with said internal wedging surface in said nozzle, said sleeve being slotted to form passageways extending past said wedging surfaces and to form electrode clamping jaws in the end of said sleeve, a member supported for tilting movement on the other end of said sleeve and having an end surface which is positioned at an oblique angle to the longitudinal axis of an electrode extending through an electrode passageway extending lengthwise of said member, and a screw forming for the other end of said nozzle a closure through which an electrode in said nozzle extends with substantially a gas-tight fit, said screw being threaded into said nozzle and applying pressure to said end surface of said member to tilt it into clamping engagement with an electrode extending through its said passageway and simultaneously applying pressure through said member to the unslotted end of said sleeve to force its said wedging surfaces against said wedging surface of said nozzle and deflect its said jaws into engagement with an electrode extending therethrough.

CHRISTIAN P. GIBBERT.